US006823047B1

(12) United States Patent
Cruickshank (10) Patent No.: US 6,823,047 B1
(45) Date of Patent: Nov. 23, 2004

(54) VOICE MESSAGING SYSTEM (75) Inventor: Brian Cruickshank, Oakville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/464,593

(22) Filed: Dec. 16, 1999

(51) Int. Cl.[7] ................................................ H04M 1/64
(52) U.S. Cl. ............................. 379/88.18; 709/201
(58) Field of Search ............................. 379/76, 88.17, 379/67.1, 88.22, 100.06, 164, 230, 88.2, 88.21

(56) References Cited

U.S. PATENT DOCUMENTS

| 5,487,103 | A | * | 1/1996 | Richardson et al. ....... 536/24.1 |
| 5,533,102 | A | * | 7/1996 | Robinson et al. ........ 379/88.25 |
| 5,812,639 | A | * | 9/1998 | Bartholomew et al. ..... 370/352 |
| 6,052,372 | A | * | 4/2000 | Gittins et al. ............... 370/396 |
| 6,157,705 | A | * | 12/2000 | Perrone ................... 379/88.01 |
| 6,229,878 | B1 | * | 5/2001 | Moganti .................... 379/67.1 |
| 6,292,799 | B1 | * | 9/2001 | Peek et al. ..................... 707/10 |

* cited by examiner

Primary Examiner—Fan Tsang (57) ABSTRACT

In the present invention there is provided a method, apparatus and system for providing a subscriber to a messaging system, such as a voice messaging system, with detailed personal information data associated with the source of a stored message (i.e., the caller that left the message). In addition to recording a message for the called party, the calling party's personal information is transmitted from a repository (such as, for example, the calling party's voice messaging system) which is received and stored by the called party's voice messaging system. In general terms, a communications device of the subscriber (i.e., the called party) is presented with the stored personal information data of the caller in the form of an information signal, by way, for example, an IVR system, which relays the stored personal information data associated with the source of the stored message to the subscriber. The subscriber may then, again through perhaps an IVR system, respond to the received message using one or more of the communications methods described by the stored personal information data.

23 Claims, 7 Drawing Sheets

VOICE MESSAGING SYSTEM

FIELD OF THE INVENTION

The invention relates to the provision of a voice messaging system. More particularly, the invention provides for the transmission, recording and use of enhanced caller identification data in a voice messaging system.

BACKGROUND TO THE INVENTION

Personal Data Interchange (PDI) occurs every time two or more individuals communicate, in either a business or personal context. The interchange of this personal information data (PID) is desirable whether the parties communicate during a single session (e.g., face-to-face, through electronic means such as telephone, video conference, etc.) or through multiple sessions (e.g., voice-mail, e-mail, correspondence, etc.). Frequently, the PDI includes the exchange of, for example, each party's phone number, address, name, employer, etc. In a business setting, this PDI has historically been accommodated through the exchange of business cards.

Recently, the amount of personal and business information which is typically exchanged has increased dramatically—fuelled by the explosion of the types of methods of communications now available. For example, in recent times, a business person may have had a business card printed with their name, employer, title, business address, business telephone and fax numbers. However, these same business cards may now include wireless numbers (both telephone and pagers), Enhanced Services Network (ESN) number and voice over Internet Protocol (VoIP) numbers, company web site information, e-mail addresses, toll-free numbers and the like printed thereon.

In the recent past, electronic communication has come to the fore of interpersonal communications. The widespread adoption of electronic mail, voice mail and the use of electronic databases (frequently in the form of electronic address books) has moved PDI into the electronic realm. Devices, such as Personal Digital Assistants (PDAs), now permit individuals to electronically and wirelessly (usually through infrared communications) exchange personal information electronically. These devices have improved the accuracy of personal information databases and reduced the time required to maintain these databases by reducing the manual entry of data from business cards and the like. Further, these devices have allowed their users to better exploit their contact information.

To facilitate electronic PDI, a standard, known as the vCard standard, has been promulgated by the versit Consortium, Version 2.1 issued Sep. 20, 1996 (the contents of which are hereby incorporated herein). This standard specifies an electronic format for personal information data and is based on the syntax of the MIME specification (RFC 1521—the contents of which are hereby incorporated herein). Pursuant to this standard, and other similar proprietary standards, electronic PDI has been widely accepted due to its inherent ease of use.

Voice mail systems have also, to a lesser extent, attempted to provide subscribers with similar easy-to-use features by electronically recording a caller's telephone number together with a voice message. The caller's telephone number is typically recorded from the CallerID information transmitted to called parties who subscribe to the CallerID service. Some voice messaging systems allow subscribers, upon hearing the message, to respond to the caller's voice message by depressing a single key whereupon the voice messaging system will place a return call using the original caller's recorded telephone number. However, voice mail systems, in many instances, have difficulty in correctly identifying the caller's telephone number. These difficulties are particularly apparent when a caller traverses the boundaries between public and private telephone networks or when the call is transmitted across disparate backbone technologies (e.g., from a conventional switched circuit based systems to voice over data networks such as VoIP). In these instances, spurious 'external line' digits (e.g., '9' or '6') may be inserted at the start of the telephone number. These spurious digits or other difficulties result in an incorrect telephone number being recorded and prevent the voice messaging system from successfully placing a return call when instructing to by a subscriber. Moreover, even when a return connection is successful, information exchange may be thwarted when the first caller has indicated in the initial message to respond via alternative methods of communication (i.e., respond via e-mail, respond via a different number).

Accordingly, an improved voice messaging system which more accurately records the caller's personal information and provides additional easy-to-use communication alternatives is desired.

SUMMARY OF THE INVENTION

A caller receiving a Call Forward No Answer (CFNA) or Call Forward Busy (CFB) is forwarded, in a conventional manner, to a voice messaging system incorporating the invention. A voice messaging system incorporating the invention may, in addition to receiving and storing a conventional voice message, receive and store electronic data corresponding to the caller's personal information. The transmitted personal information data may comply with the vCard standard. A subscriber to the voice messaging system incorporating the invention can then be presented, perhaps through an Interactive Voice Response (IVR) or through use of personal computer in communication with the voice messaging server, with the caller's message and the caller's personal information. Further, the subscriber may then respond to a voice message including personal information data by selecting, through, for example, an IVR, one or more of the communications options available.

The personal information data may be transmitted from the caller's voice messaging system to the called party's voice messaging system using a data network. The communication between the caller's and the called party's voice messaging system may be initiated by the caller's voice messaging system (in co-operation with the caller's PBX) using a network address look-up table and the actual telephone number dialled by the caller. The network address look-up table maps called numbers to network addresses of voice messaging systems servicing the party associated with the number called.

In one aspect of the present invention there is provided a method of providing voice mail services comprising: receiving a voice transmission from a caller; storing said received voice transmission in a voice mailbox of a subscriber; receiving a data transmission related to said received voice transmission, said data transmission comprising personal information data (PID) corresponding to said caller; and storing said received PID in said voice mailbox.

In another aspect of the present invention there is provided a voice mail system comprising: a first input/output (I/O) communicating with a voice network; a second I/O communicating with a data network; memory; a central processor in communication with said first I/O, said second I/O and said memory, said central processor adapted to: receive voice messages from callers for subscribers to said voice mail system through said first I/O; store said received voice messages in a database in said memory; receive personal information data (PID) from said callers through said second I/O; and store said received PID in said database in said memory such that PID relating to a given caller is linked to a voice mail message from said given caller.

In another aspect of the present invention there is provided a method of providing voice mail services comprising: receiving a voice transmission from a caller over a first network; storing said received voice transmission in a voice mailbox of a subscriber; receiving a data transmission related to said received voice transmission, said data transmission comprising personal information data (PID) corresponding to said caller and received over a data network, said second network comprising a data network; and storing said received PID in said voice mail.

In another aspect of the present invention there is provided a computer readable media comprising computer code for adapting a computer to: receive a voice transmission from a caller; store said received voice transmission in a voice mailbox of a subscriber; receive a data transmission related to said received voice transmission, said data transmission comprising personal information data (PID) corresponding to said caller; and store said received PID in said voice mailbox.

In another aspect of the present invention there is provided a computer readable media comprising computer code for adapting a computer to: receive voice messages from callers for subscribers to said voice mail system through a first I/O of said computer; store said received voice messages in a database in memory of said computer; receive personal information data (PID) from said callers through a second I/O of said computer; and store said received PID in said database in said memory such that PID relating to a given caller is linked to a voice mail message from said given caller.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein.

It will be appreciated that for simplicity and clarity of illustration, elements illustrated in the accompanying drawings have not necessarily been drawn to scale. For example, the dimensions of some of the elements are exaggerated relative to other elements for clarity. Further, where considered appropriate, reference numerals and labels have been repeated among the drawings to indicate corresponding or analogous elements. Where also considered appropriate, descriptive tags defined in the specification have been repeated herein.

DETAILED DESCRIPTION OF THE PREFERRED EMBODIMENTS

In the present invention there is provided a method, apparatus and system for providing a subscriber to a messaging system, such as a voice messaging system, with detailed personal information data associated with the source of a stored message (i.e., the caller that left the message). In general terms, a communications device of the subscriber (i.e., the called party) is presented with the personal information data of the caller in the form of an information signal, by way, for example, an WVR system, which relays the stored personal information data associated with the source of the stored message. The subscriber may then, again through perhaps an WVR system, respond to the received message using one or more of the communications methods described by the stored personal information data.

Figure 1:
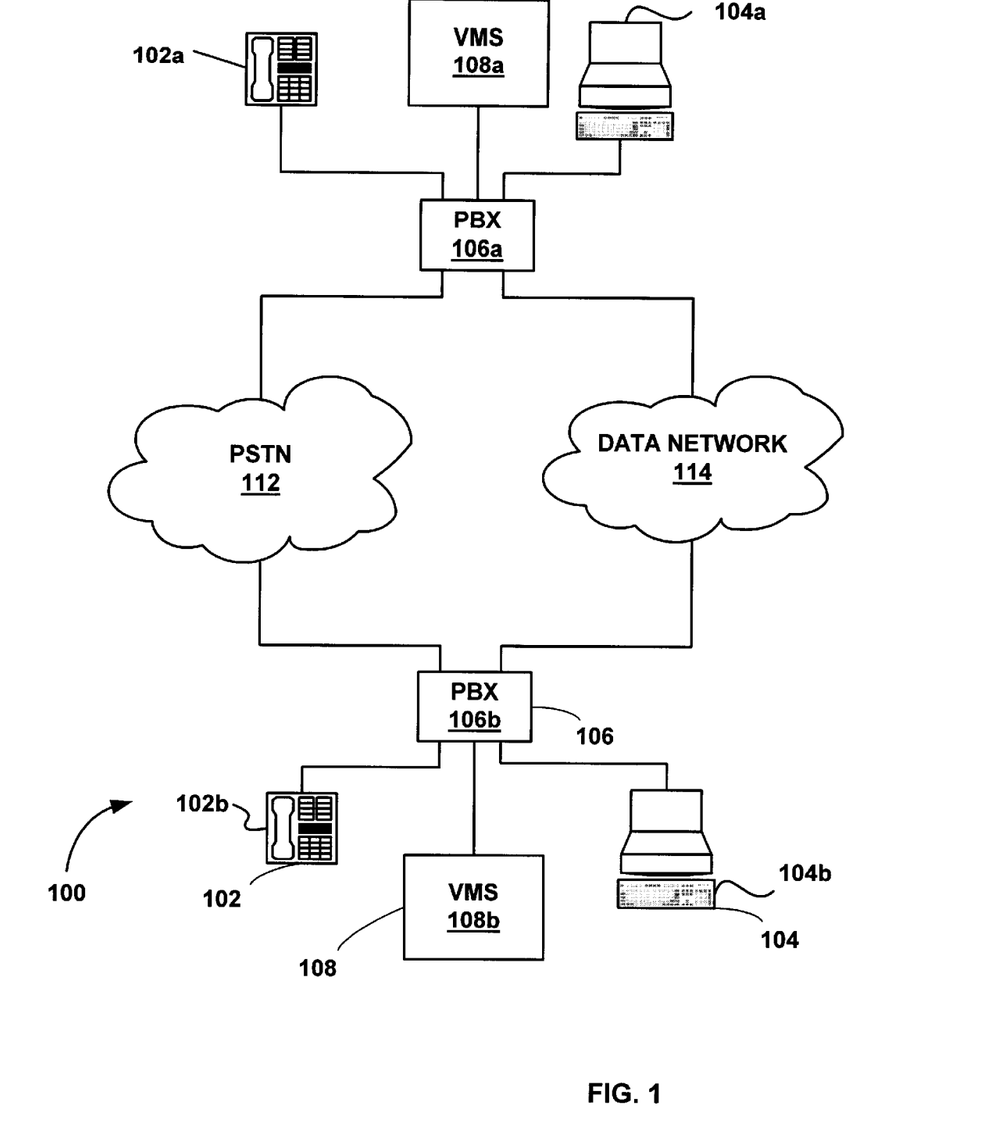
FIG. 1 is a schematic of a system embodying an aspect of the invention.

Referring to FIG. 1, a voice messaging system according to a first embodiment of the invention is shown generally at 100 (also referred to herein, for ease of reference, as voice messaging system 100). Voice messaging system 100 includes a plurality (two as illustrated) of Private Branch Exchanges (PBX) 106a, 106b (hereinafter collectively and generically PBX 106) in communication via a first network for carrying voice, illustrated as the Public Switched Telephone Network (PSTN) 112, and a second network carrying data, illustrated as data network 114. In communication with each PBX 106a, 106b is a voice messaging server (VMS) 108a, 108b, respectively (hereinafter collectively and generically VMS 108). Through a PBX 106, a subscriber may communicate, in a conventional fashion, with VMS 108 using a telephone handset 102 or computer 104.

As will be appreciated by those skilled in the art, first and second networks 112 and 114 may be implemented as a single integrated network. For example, an integrated VoIP network transmits both voice and conventional data as digitized and packetized data over the same network. Accordingly, telephone handset 102 may, in conjunction with an integrated network, be implemented as a VoIP telephone handset or, alternatively, may be a conventional telephone handset with the necessary analog to digital signal conversion performed by PBX 106 to facilitate communications between the integrated digital network and the conventional analog telephone handset.

It will also be appreciated by persons skilled in the art that data network 114 can be any one of a variety of network infrastructures. For instance, network 114 may be any type of Local Area Network (LAN), such as an Ethernet or Token-ring LAN or a carrier sense multiple access with carrier detection (CSMA/CD) LAN. Alternatively, or in addition, network 114 may include a wide area network (WAN) deployed using a network topology such as X.25, frame relay, asynchronous transfer mode (ATM) or synchronous optical network/synchronous digital hierarchy (SONET/SDH), or inter-networked combinations thereof. Network 114 may alternatively be a circuit switched network, such as a public switched telephone network (PSTN), through the use of a modem, or a privately leased switched network (such as a T1, E1, T3 or E3 circuit switched network). In any combination of the above network topologies, network 114 may be a public network, a private network or intranet, or part of the Internet.

Those skilled in the art will also appreciate that a subscriber to VMS 108 may use a computer 104 to transmit or retrieve voice mail messages. That is, computer 104 may incorporate the functions of a conventional telephone handset 102 or, alternatively, may be in communication with a conventional telephone handset 102.

Further, PBX 106 may be replaced by a central office (CO) switch, LAN PBX, Media Gateway or Merged Gateway Control Protocol (MGCP) compliant gateway or other voice switching fabric.

In overview, and without limiting the scope of the invention described herein, voice messaging system 100 provides a mechanism for transmitting, storing, retrieving and utilizing personal information data in addition to a conventional voice mail message. In a typical scenario, a source (i.e., a caller), using telephone handset 102a or computer 104a, attempts to communicate, via PSTN 112, with a destination (i.e., a called party)—a subscriber of VMS 108b—and receives a CFNA or CFB signal. Accordingly, the call is forwarded to VMS 108b by PBX 106b. A communications session between VMS 108b and the caller then commences using the facilities of PSTN 112. The caller, upon being presented with conventional voice mail options, records a message which is stored in the called party's voice mailbox (VMB) at VMS 108b. Following, or simultaneous with, the session between the caller and VMS 108b, a data session between the caller's PBX 106a and the called party's PBX 106b is established using the facilities of data network 114. During the data session, the caller's personal information data is transmitted from PBX 106a to VMS 108b via data network 114 and PBX 106b. The caller's personal information is then stored and associated with the caller's message by VMS 108b. The subscriber, upon retrieving the caller's message (using conventional techniques) is presented with the caller's personal information data by VMS 108b. The subscriber can then respond to the recorded message using one or more of the communications media described by the caller's personal information data.

For the purposes of illustration, a communication from a source to a destination is discussed below in the context of a standard, wire-based telephone call from a calling party to a called party. It will be appreciated, however, that a communication in the context of the present invention may also include communications involving other media types such as a cell phone transmission, a pager message, a fax communication, an audio/video communication such as a video conference call over a data network, a voice call over IP, etc.

As well, while voice messaging system 100 is discussed in the context of a voice messaging system, voice messaging system 100 may in other embodiments include, in the alternative or in addition, other messaging services such as audio/video messaging or fax messaging. Similarly, computers 104 may include one or several different types of (end-user) communications devices, such as network computer terminals, networked personal computers, network display telephones, public display telephones, or wireless communications devices such as mobile telephones connected over a wireless network.

Figure 2:
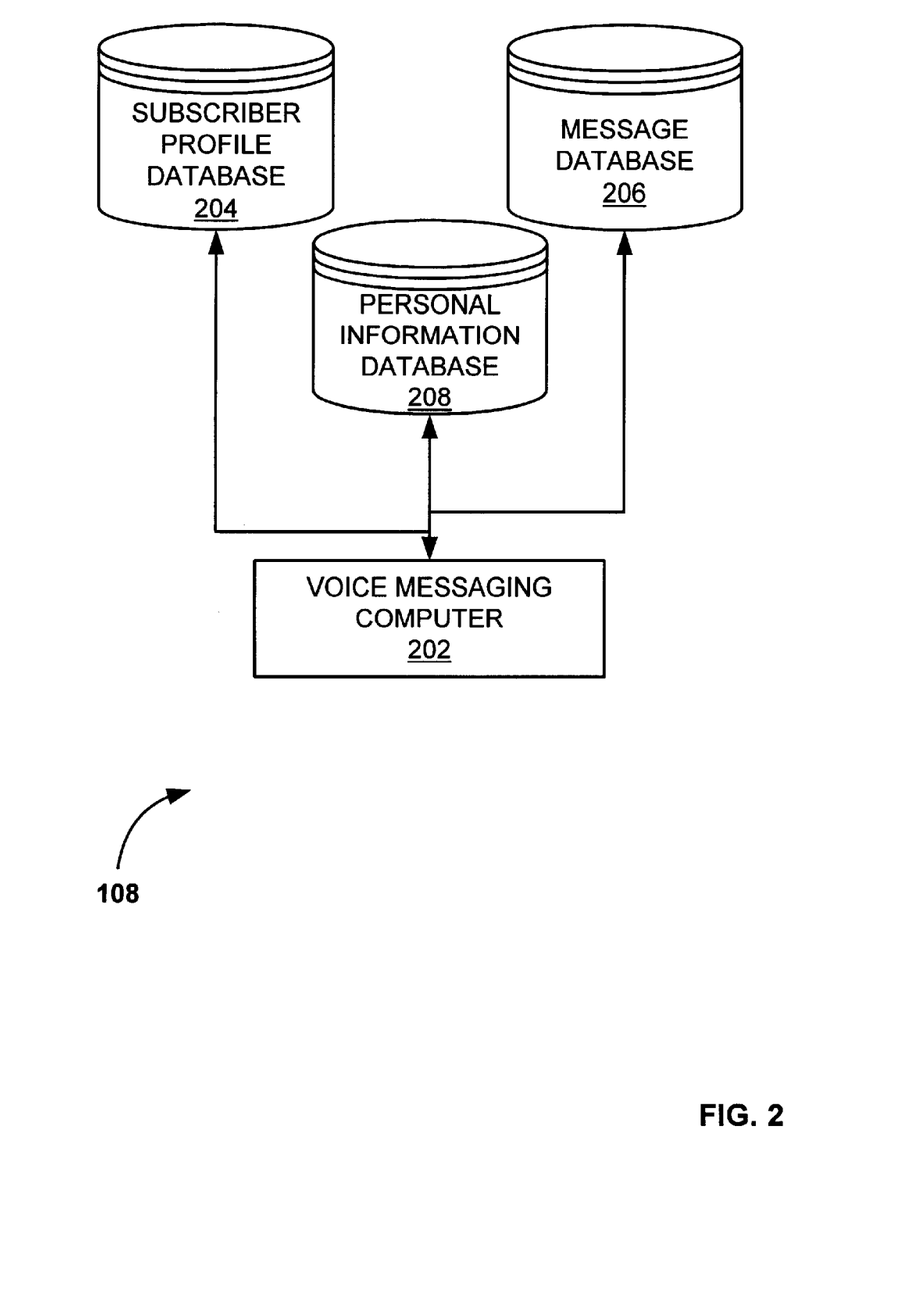
FIG. 2 is a detailed schematic of a first portion of FIG. 1.

Referencing FIGS. 1 and 2, the exemplary VMS 108 comprises a voice messaging computer 202 in communication with a subscriber profile database 204, message database 206 and personal information database 208.

Figure 3:
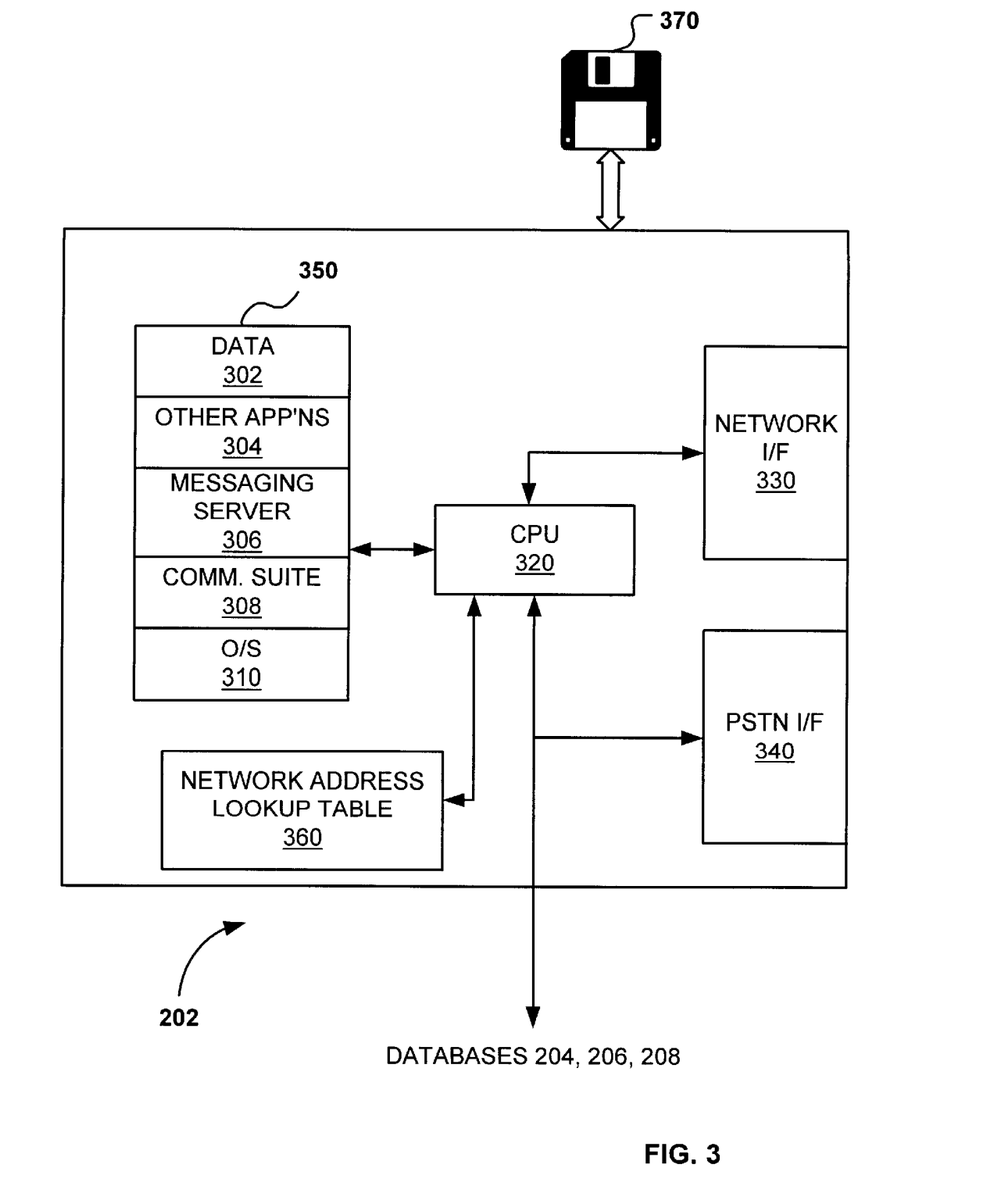
FIG. 3 is a detailed schematic of a first portion of FIG. 2.

Referring to FIG. 3, there is shown a more detailed representation of voice messaging computer 202 which forms part of VMS 108 in the first embodiment of the invention illustrated in FIG. 1. As shown in FIG. 3, voice messaging computer 202 comprises central processing unit (CPU) 320 in communication with memory 350, network interface 330, PSTN interface 340, removable media 370, network address look-up table 360 and databases 204, 206 and 208 (FIG. 2). Memory 350 includes data 302, other software applications 304, messaging server software 306, communications suite 308 and operating system 310.

Voice messaging computer 202 is a networked computer which is directly or indirectly connected to network 114 (see FIG. 1) and is a server suitable for hosting messaging services for a plurality of subscribers. By way of example, voice messaging computer 202 may be a Reduced Instruction Set Computing (RISC) device such as a Sun Microsystems UltraSparc™ Station or an IBM RS/6000™, or a personal computer suitable for hosting messaging services such as a Compaq Proliant™ or an IBM NetFinity™ server. Preferably, voice messaging computer 202 is scalable to the needs of VMS 108 (FIG. 1) as the number of subscribers increases.

As illustrated in FIG. 3, memory 350 provides a memory store for software and data residing on voice messaging computer 202 such as messaging server software 306, communications suite 308 and operating system 310. Memory 350 also stores data 302 for remote or local retrieval and other applications 304. Other applications 304 may include, for example, software that provides Interactive Voice Response (IVR) finctionality such as, for example, the Nortel Networks™ Symposium™ IVR system. Operating system 310 is preferably a multitasking operating system such as Unix, Linux, Microsoft Windows NT™, Sun Solaris™ or IBM AIX™. Communications suite 308 includes software providing transport and routing communication protocols as well as network interface software for enabling communications over network 114 (FIG. 1). Communications suite 308 may include the well known and ubiquitous TCP/IP suite of services, although other communications protocols, such as those adhering to the Open Systems Interconnection (OSI) reference model in the International Standards Organization (ISO) standard 30698, or layered arrangements which make use of TCP or EP with other available protocols, may be used in the alternative, so long as such communications suites are sufficient to provide a networked environment for use of the graphical message waiting notification system contemplated herein.

As is known in the art, the Internet Protocol (EP) is a widely used connectionless routing protocol, similar to the connectionless network protocol (CNLP) specified in ISO 84304 (hereby incorporated herein by reference), and serves as the foundation for routing over a variety of networks, including the Internet. Connection-oriented services can be, and often are, provided over the IP protocol using a higher layer transport protocol such as the Transmission Control Protocol (TCP). TCP is a connection-oriented, packet-switching protocol used for communications between processes in host computers and connected users. TCP maintains status and state information about each user data stream flowing into and out of the associated TCP software module. The TCP protocol also provides end-to-end data transfer across one network or multiple networks to a higher layer protocol or application at a destination resource. In the TCP/IP model, communications at the network layer between voice messaging computer 202 and network 114 are handled by the network interface which in the illustrative embodiment in FIG. 1 may implement the IEEE 802.3 Ethernet standard (the contents of which are hereby incorporated herein).

Network address look-up table 360 provides a table or database mapping a desired called party's telephone number (or other unique identifier) to the data network address of the called party's VMS 108. Look-up table 360 may be provisioned with the called party's telephone number and the called party's VMS 108 by an operator. Network address look-up table may, alternatively or simultaneously, use the functions of an H.323 gatekeeper (which uses the Q.931 standard—the contents of which are hereby incorporated herein—to carry callerID information) to provide this mapping feature. Alternatively, the functions of look-up table 360 may be performed using a database (preferably a distributed database). For example, the database performing the functions of look-up table 360 may be modeled on the Directory Name service (DNS) used in the Internet, or, alternatively, upon Lightweight Directory Access Protocol (LDAP) which is described in IETF publications 1777, 1778 and 1823 (the contents of each of which is hereby incorporated by reference).

Messaging server software 306 is an application layer entity which preferably resides on voice messaging computer 202 in memory 350 and executes on central processor 320 of voice messaging computer 202. Messaging server software 306 comprises computer readable codes which program voice messaging computer 202 to provide voice messaging services described herein. It will be appreciated, however, that voice messaging services may be provided in sets of codes within two or more interoperable software applications running on the same voice messaging computer 202 or on several connected computer servers.

Messaging server software 306 directs voice messaging computer 202 to communicate with subscriber profile database 204, message database 206 and personal information database 208. Databases 204, 206 and 208 may reside in one or more memory stores, preferably including at least one permanent storage device such as a hard disk drive, located on voice messaging computer 202 or on separate server computers networked in communication with voice messaging computer 202. The messaging server software 306 uses the subscriber profile database 204, message database 206 and the personal information database 208 which serve as data stores for the management and provision of message and personal information data within VMS 108.

Voice messaging computer 202 is also capable of reading computer readable media 370, which may be a diskette, CD-ROM or other method of transferring data to memory 350 of voice messaging computer 202.

Subscriber profile database 30 (FIG. 2) stores a subscriber profile 400 (FIG. 4) for each subscriber to VMS 108 (FIG. 1). A subscriber profile 400 includes one or more data structures for the management and provision of subscriber identification information and subscription services. The subscriber profile 400 is also referred to as a voice mailbox (VMB). Typically a subscriber profile 400 will include such information as an identifier 402 of the subscriber's VMB on VMS 108, recorded greetings 404, recorded message indices 408, and other data known and used in conventional voice messaging systems. Additionally, each subscriber's profile 400 will include a personal information index 406 into personal information database 208. Personal information index 408 stores pointers to a subscriber's personal information data stored in database 208 and the personal information data received from calling parties. Similarly, the recorded message indices act as pointers to messages received for a particular subscriber and stored by VMS 108 in message database 208.

Figure 5:
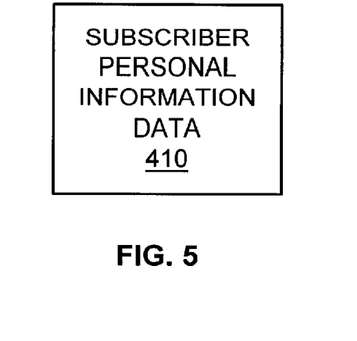
FIG. 5 is a detailed schematic of a third portion of FIG. 2.

Each subscriber will also have personal information data 410 (FIG. 5) stored in personal information database 208. Each subscriber may have stored a variety of information stored as personal information data in database 208. The personal information may be stored in a vCard compliant format. For example, a typical subscriber may store their full given name, preferred name, title, employer, business address(es), employee position, business telephone number, VoIP address information, e-mail address(es), pager number, ESN number, toll-free numbers, fax numbers, corporate web site address, name and relevant information about the subscriber's assistant(s)—if any, teleconferencing service information, time zone information, location information (such as geographical positioning data), general notes and any other desired information.

Figure 4:
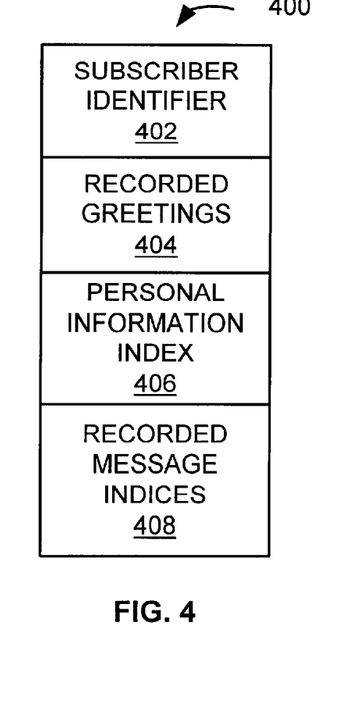
FIG. 4 is a detailed schematic of a second portion of FIG. 2.
Figure 6:
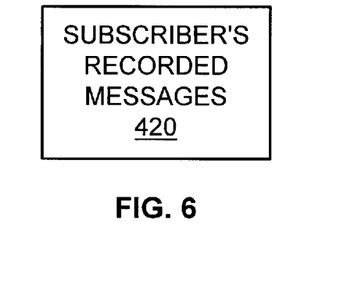
FIG. 6 is a detailed schematic of a fourth portion of FIG. 2.

Each subscriber will also be provisioned with a received message mailbox 420 (FIG. 6) in message database 206. Message database 206 stores incoming messages recorded for the subscriber. The messages will be retrieved from database 206 using pointers stored in a subscriber's recorded message index field 408 of the subscriber's user profile 400 (FIG. 4).

As will be appreciated by those skilled in the art, databases 204, 206 and 208 have been arbitrarily separated and, if desired, may be combined into one or more databases wherein each subscriber's profile, personal information and recorded messages are stored in the database(s).

Figure 7:
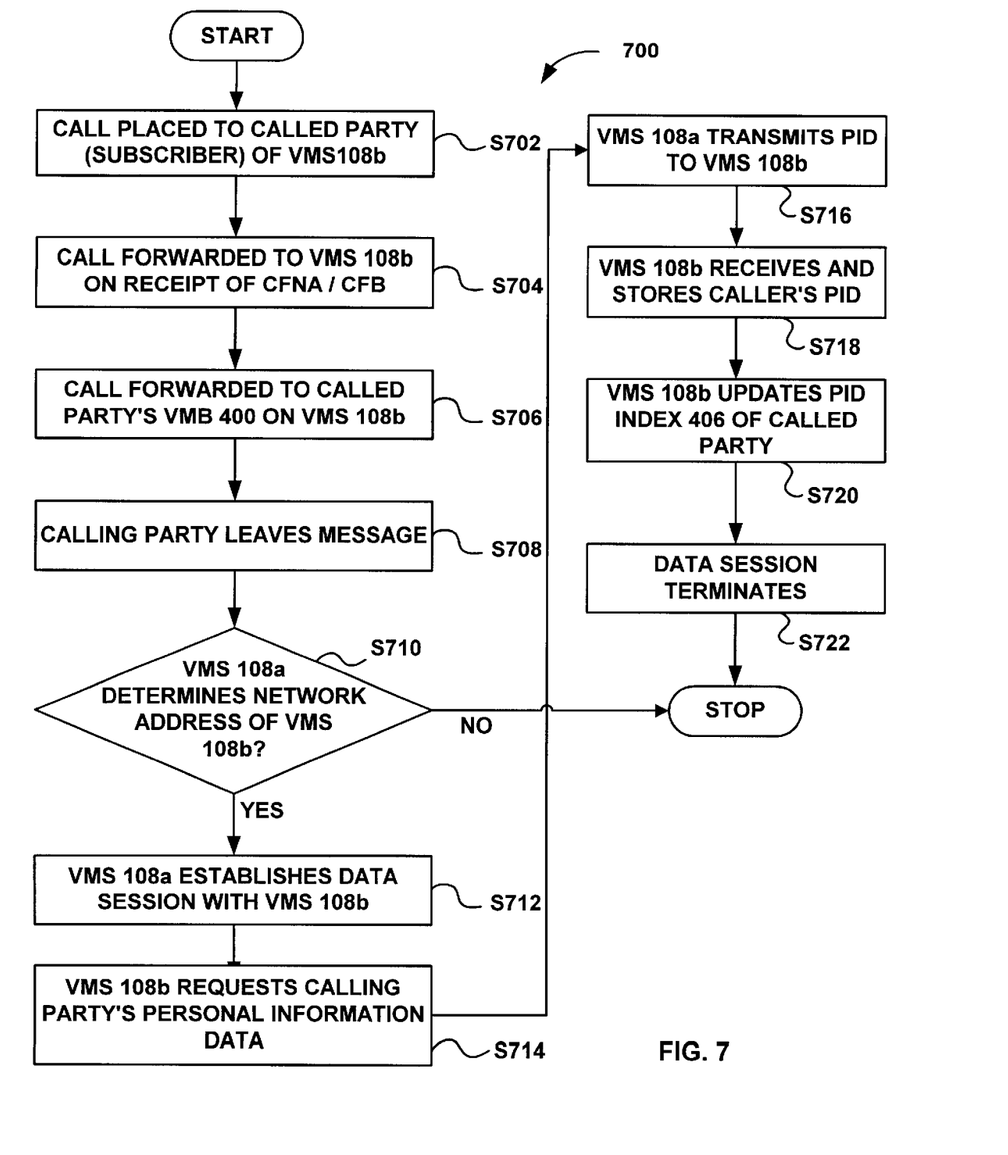
FIG. 7 is a flowchart illustrating a first set of operations of the system of FIG. 1.

Referring to FIGS. 1 to 6, in conjunction with the flowchart illustrating operations 700 in FIG. 7 of VMS 108 (FIG. 1), a caller, using telephone handset 102a, attempts to contact the subscriber associated with called telephone handset 102b by placing a conventional call through PBX 106a, PSTN 112 and PBX 106b (S702). Upon receipt of a CFNA or CFB, the call is forwarded by PBX 106b to VMS 108 in the conventional manner (S704), and the caller is forwarded to the called party's VMB 400 stored in subscriber profile database 204 (S706). The calling party is then presented with the called party's greetings (in the conventional manner) and given the opportunity to leave a message (S708). During this session, the VMS 108a of the calling party attempts to determine the data network address of the called party by accessing network address look-up table 360 (S710). As described heretofore, network address look-up table 360 maps a conventional telephone number to a network address of a PBX connected to data network 114. If a VMS 108a is able to retrieve a network address based on the called party's telephone number (obtained from PBX 106a), VMS 108a, through the facilities of PBX 106a, data network 114 and PBX 106b, establishes a communications session with VMS 108b (S712). As will be appreciated, since the calling party's VMS 108 attempts to retrieve the network address of the called party's VMS—using the actual number dialed (that is, the number used to set-up the transmission route or path to the called party) by the calling party—the telephone number used during access to look-up table 360 is assured to be accurate. Accordingly, the potential problem of having inaccurate callerID information, which is conventionally used by a VMS, is side-stepped and overcome. If VMS 108a is not able to determine the network address of the VMS 108b associated with the called party, then VMS 108b operates in a conventional fashion (i.e., the calling party leaves only a voice mail message with no additional PID being associated therewith).

If a data communications session between VMS 108*a* and VMS 108*b* is established (S712), VMS 108*b* requests the calling party's personal information data (stored in the exemplary embodiment in personal information data 410 of personal information database 208 of VMS 108*a*) (S714). Responsive to this request, VMS 108*a* transmits the calling party's personal information data to VMS 108*b* (S716). VMS 108*b* on receipt of the calling party's personal information data, stores the calling party's personal information data in personal information database 208 (S718) and updates the called party's VMB 400 and, more specifically, personal information index 406 (S720). Consequently, the calling party's PID will be associated or linked with the calling party's message stored in the called party's VMB 400. The data session between VMS 108*a* and 108*b* then terminates (S722).

As will be appreciated, the identity of the calling party needs to be determined so the PID transmitted and stored in steps S716 and S718 accurately reflects the actual calling party. VMS 108*a* may, for example, simply assume that the calling party is the person to whom the telephone handset 102*a* is assigned. That is, in many offices, each subscriber is typically assigned an extension or phone number that is associated with a particular telephone handset. Accordingly, VMS 108*a* may assume that the calling party is the person assigned to a particular handset. However, this may cause difficulties (i.e., inaccurate PID being transmitted in S716) when a telephone handset 102 is used by a calling party other than the person assigned to the particular telephone handset. Accordingly, it may be desirable in step S702 for the calling party to identify themselves to PBX 106*a* prior to the call to the called party being placed. For example, the calling party, using any telephone handset, may indicate their identity to PBX 106 by sending a signal (such as a key sequence identifying the calling party's VMB on VMS 108*a*) to PBX 106*a* prior to the voice connection to PBX 106*b* being established. As will be appreciated by those skilled in the art, other methods (such as, for example, voice recognition, use of a card or badge reader reading the caller's ID card) could be used to identify a calling party and fall within the scope of the present invention.

In the example described above, the called party—a subscriber to VMS 108—retrieves stored voice messages and the associated personal information data through operations 800 (FIG. 8) performed by VMS 108. A subscriber contacts and commences a session with VMS 108 (S802) in a conventional manner (e.g., using telephone handset 102*a*, computer 104*a*, etc.). After VMS 108 confirms the identity of the subscriber (typically through an identification number and password) VMS 108 presents to the subscriber the messages available for review and stored in the subscriber's VMB 400 (FIG. 4) (S804). This presentation, when the subscriber is using telephone handset 102*b*, is conventionally facilitated through an IVR system which presents the subscriber with itemized lists of operations that can be initiated by the subscriber selecting an item through a keypad sequence. For messages retrieved that have associated personal information data, the subscriber may then be presented with this data (S806) through the IVR system.

As mentioned herein, the personal information data associated with a particular message may be received and stored according to the vCard standard. According to the vCard standard, a vCard object is composed of several properties. Each property, or individual attribute, takes the form of a property name, property parameters and a property value. An example, is the string "TEL:Work:+1-202-555-1234". This example indicates that the individual associated with this vCard has a work or business telephone number of (202) 555-1234.

Figure 8:
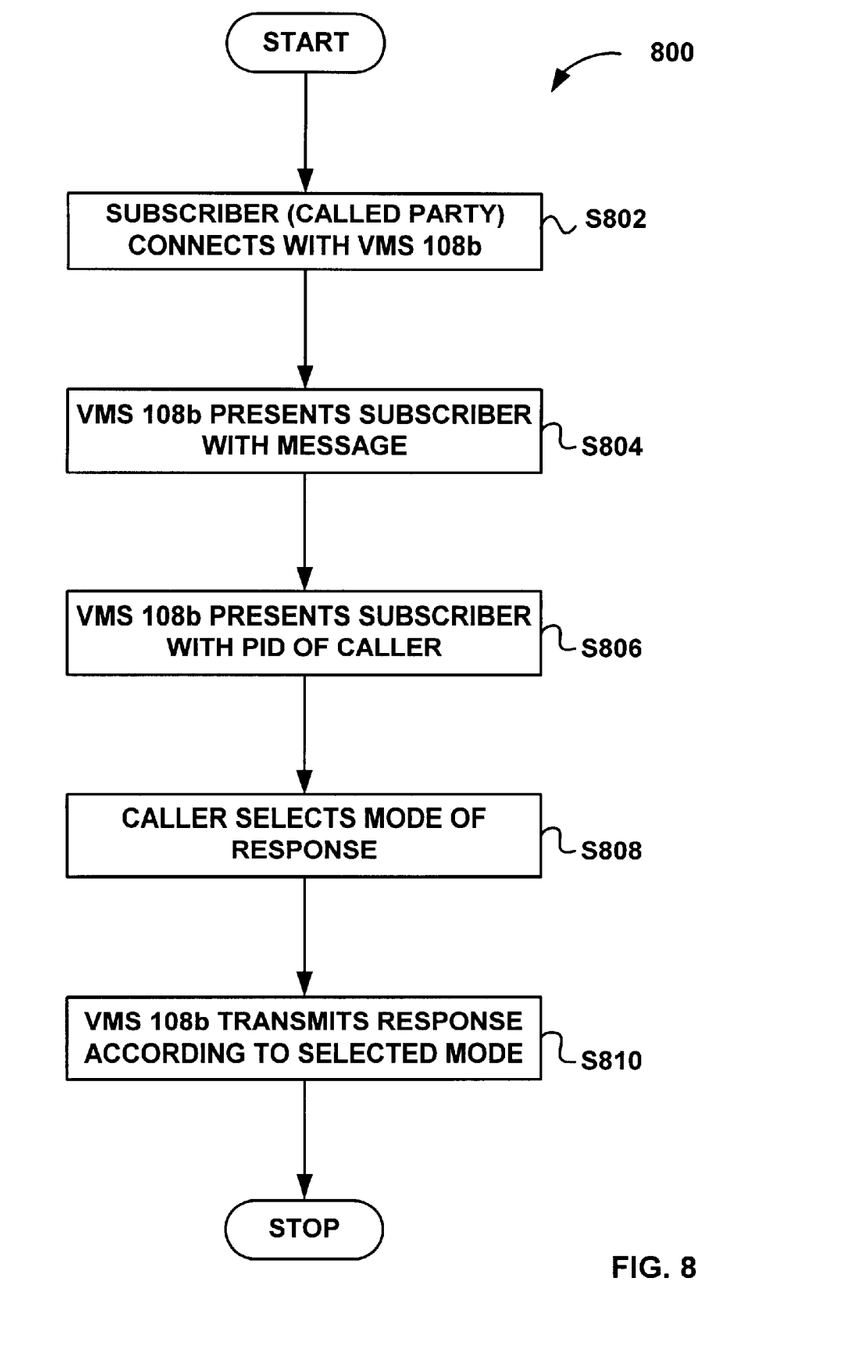
FIG. 8 is a flowchart illustrating a second set of operations of the system of FIG. 1.

Upon retrieval of a calling party's PID (S806), VMS 108*b*, in association with an IVR system, may parse this data (e.g., the vCard compliant data), to generate items for presentation to the subscriber in a manageable form. VMS 108*b* may generate a menu of items, each having sub-menus. Alternatively, VMS 108*b* may present only those items that are deemed relevant based on the circumstances and/or the services available to VMS 108*b*. For example, the calling party's PID may include data corresponding to fax numbers, pager numbers, voice telephone numbers and an e-mail address (in addition to the name, address and other conventional business card type data). However, VMS 108*b* may not be able to offer to a subscriber (the called party) the service of responding to the retrieved voice mail message by electronic mail. In such a case, VMS 108*b* may present to the user only those communications media (e.g., conventional voice telephone communication) that VMS 108*b* can facilitate.

Referring back to FIG. 8, once all or a portion of the PID data is presented to the subscriber (S806), the subscriber may select a method of response (S808). For example, the subscriber (called party) may wish to return the call using the caller's wireless phone number instead of the phone number from which the call originated. Accordingly, the subscriber will indicate to VMS 108*b*, through perhaps voice command or a keypad sequence, the preferred method of response (S808). It should be noted that the subscriber may select no response, if desired. In response to the selection of S808, VMS 108*b* performs the appropriate and selected action (S810). In the example indicated above, VMS 108*b* would place a call, over PSTN 112, to the wireless number indicated by the subscriber (S808) from the retrieved caller's PID.

In a further embodiment, the subscriber may, using time zone information that may be contained in the calling party's PID, presented with the present local time of the caller and the local time of day that the message was received to assist the subscriber in determining the best mode of response in step S808.

Similarly, if the caller's PID contains geographical positioning data (which may provide an accurate location of the location from which the original call was placed), this information may be also be used in assisting the subscribing to determine the best mode of response in step S808. Use of geographical positioning data may be useful to determine the location (or likely present location) for individuals doing field work (such as, for example, field technicians).

While the above examples were indicated with the called party/subscriber communicating with VMS 108*b* via a conventional telephone handset 102*b*, the called party may, alternatively, communicate with VMS 108*b* via computer 104*b*. In this instance, in step S806, the calling party's PID is transmitted to computer 104*b*. This may be desirable so that the called party may store the calling party's PID at local computer 104*b*. Use of computer 104*b* may enable the called party to respond to a voice message, using the calling party's PID, using a communication facilities that may not be available through VMS 108*b*. Once stored in computer 104*b*, the calling party's PID may be stored in a contact list (such Microsoft™ Outlook™) or transferred to a personal digital assistant (PDA).

In a further alternative, due to continuing computer/telephony integration, it is known to notify subscribers to a voice messaging system of received messages by electronic mail. In this manner, a subscriber accessing their e-mail is typically presented with controls (such as buttons) on the computer's display for playing, pausing, rewinding, fast forwarding and stopping audio playback of a message through the audio facilities of the subscriber's computer. In the alternative embodiment, a subscriber may be presented with an electronic business card that incorporates the caller's PID and similar controls for playing, pausing, rewinding, fast forwarding and stopping audio playback of a received message. In this alternative embodiment, the electronic business card may incorporate the caller's audio message as an attachment that is accessed by the included controls or, alternatively, the controls may transmit messages that instruct the VMS to play, pause, rewind, fast forward or stop the message associated with the PID displayed as an electronic business card.

In a further alternative, VMS 108 may provide that responses to retrieved messages may comprise text or data. For example, using the facilities of PBX 106 which communicates with data network 114 (FIG. 1), VMS 108 may use speech to text software (such as, for example, IBM™ ViaVoice™ or Dragon Systems DragonDictate™) to convert a subscriber's voice to text. This text may then be transmitted over either PSTN 112 (in the instance where the subscriber desires to respond by facsimile transmission, for example), or via data network 114 (in the instance where the subscriber wishes to respond by e-mail, for example).

In a still further embodiment, VMS 108 may not store a subscriber's PID directly in personal information database 208 (FIG. 2). Rather, a subscriber could designate a source (such as URL or file) where the subscriber's PID is located. In this instance, VMS 108 (in step S716—FIG. 7) would store the location of the source of this information, and retrieve the subscriber's PID using data network 114 to communicate with the source location. This may be preferable so that a subscriber can easily update, alter and generally maintain their own PID. This alternative embodiment enables VMS 108 to offload some storage requirements.

Figure 9:
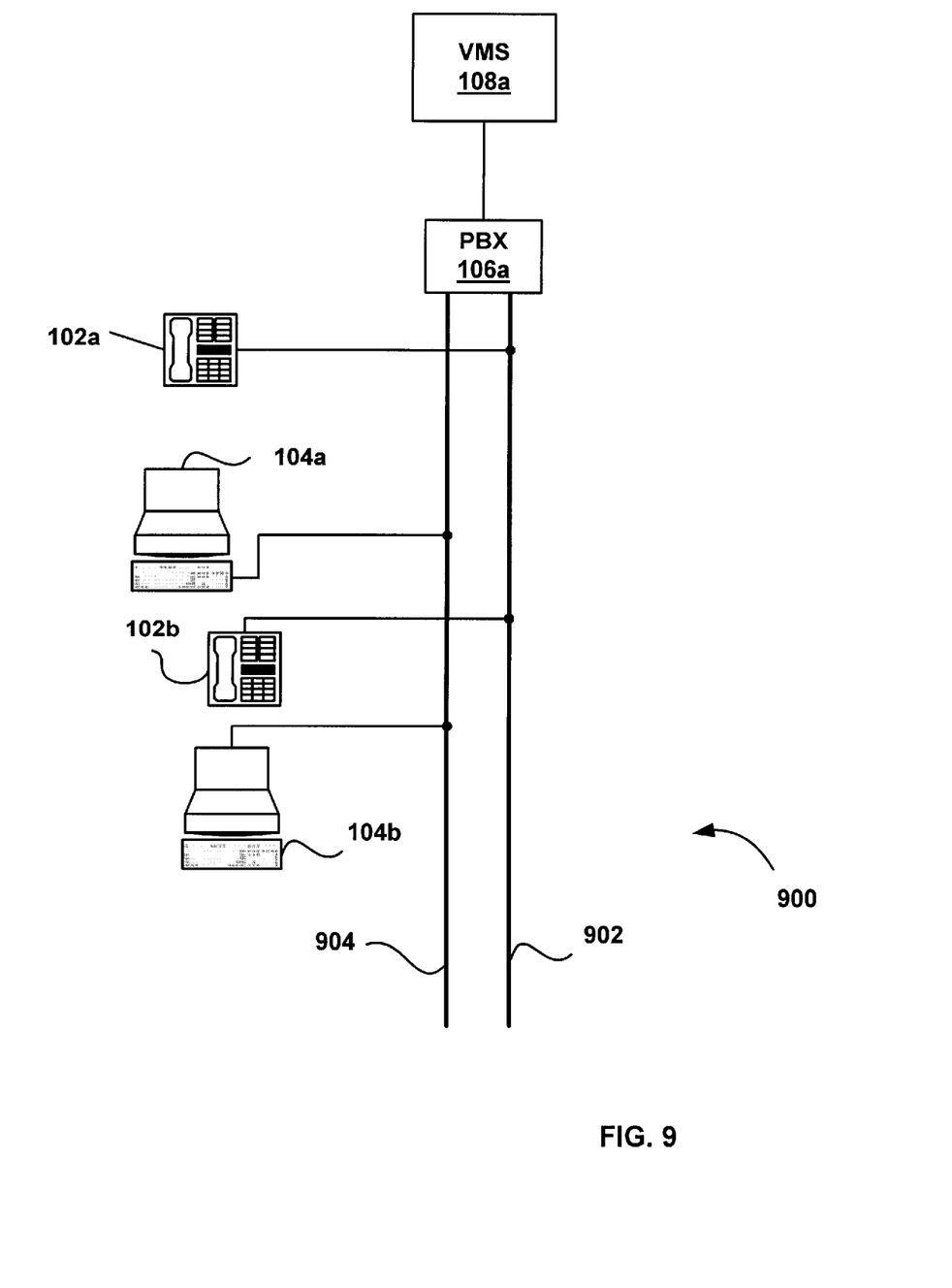
FIG. 9 is a schematic of a alternative system embodying aspects of the present invention.

Several alternative embodiments to the embodiment disclosed and illustrated in FIGS. 1 through 8 are illustrated in FIG. 9.

Dissimilar to voice messaging system 100 (FIG. 1), voice messaging system 900 (FIG. 9) may be the preferred embodiment where the calling and called parties are both subscribers to the same PBX 106. In the exemplary illustration, voice messaging system 900 comprises a voice line 902 and a data line 904. Accordingly, computers 104a, 104b are connected in a conventional fashion to data line 104 (which may be, for example, a conventional Ethernet, Token-ring or other data network described above) and telephone handsets 102a, 102b are in communication with voice lines 902. As described heretofore, integrated networks combining voice and data are well known. Accordingly, voice and data lines 902, 904 may be one and the same. In this embodiment VMS 108a and VMS 108b of FIG. 1 may be one and the same. However, as those skilled in the art will appreciate a single network interconnecting computers 104a, 104b and telephone handsets 102a, 102b, which may be geographically dispersed. Accordingly, voice messaging system may incorporate LAN PBXs or H.323 gateways. In any event, steps S710–S718 of operations 700 can be eliminated. Instead, VMS 108 may simply update the called party's PID index 406 with a pointer to the calling party's PID which is also stored by VMS 108.

In a further embodiment, and referencing FIGS. 1 and 7, a call may be placed to a subscriber (called party) of VMS 108b from an intelligent handset such as, for example, a digital wireless telephone that uses VoIP technology (S702). This type of digital wireless telephone may, for example, be a so-called 3G wireless handset. Similar to system 100 (FIG. 1), the call will be forwarded to VMS 108b when the caller receives a CFNA or CFB (S704), the caller will be forwarded to the subscriber's VMB 400 on VMS 108b (S706) and the caller will leave message for the subscriber in the usual fashion (S708). Since, in this alternative embodiment, the wireless handset uses VoIP technology, the wireless handset may establish a data session with VMS 108b (S712) (using, for example, TCP/IP) and transmit the caller's PID (which will be stored in the wireless handset) to VMS 108b (S716) upon receipt of a request for the PID from VMS 108b (S714). The PID is then stored by VMS 108b (S718), the called party's PID index 406 (FIG. 4) is updated accordingly (S720) and the data session between the wireless handset and VMS 108b is terminated (S722). In this alternative embodiment, the need for VMS 108a and PBX 106a is removed since the wireless handset contains the necessary functionality. In a further alternative, the called party may also have a similar intelligent handset (which may also be wireless). In this embodiment, the PID of the caller may be transmitted directly to the and stored by the called party's handset. In this latter embodiment, the need for VMS 108b and PBX 106b may be reduced or removed entirely (if the voice message left the calling party is also stored by the called party's handset).

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

I claim:

1. A method of providing voice mail services comprising:

receiving a voice transmission from a caller at a receiving voice mail system;

storing said received voice transmission in a voice mailbox of a subscriber;

receiving a data transmission related to said received voice transmission at said receiving voice mail system, said data transmission comprising personal information data (PID) corresponding to said caller, separate from caller identification information, if any, associated with said voice transmission, and transmitted by:

determining a data network address of said receiving voice mail system;

establishing a data communications session between a voice mail system of said caller and said receiving voice mail system utilizing said data network address; and retrieving PID at said caller's voice mail system and sending said data transmission with said PID to said receiving voice mail system; and storing said received PID in said voice mailbox.

2. The method of claim 1, wherein said step of determining a data network address comprises:

at said voice mail system of said caller, determining a number dialed by said caller to establish a transmission path for said voice transmission; and retrieving a data network address for said receiving voice mail system from a data network address table using said number.

3. The method of claim 1, further comprising:

at said receiving voice mail system:

receiving a message retrieval request from said subscriber;

retrieving said stored voice transmission;

playing said retrieved voice transmission for said subscriber; and presenting to said subscriber said stored data transmission comprising said PID of said caller.

4. The method of claim 3, wherein said presenting step comprises:
presenting to said subscriber data corresponding to at least one communications method used by said caller.

5. The method of claim 4, wherein said presenting to said subscriber comprises:
determining communications methods identified in said PID of said caller;
from the determined communications methods identified, determining communications methods available for response; and
presenting said determined communications methods available for response to said subscriber.

6. The method of claim 4, further comprising:
receiving a response request from said subscriber selecting at least one of said at least one communications method; and
establishing a communications session responsive to said received response request.

7. The method of claim 6, wherein said voice transmission is received from a Public Switched Telephone Network (PSTN).

8. The method of claim 7, wherein said data transmission is received from a packet switched network.

9. The method of claim 6, wherein said voice transmission and said data transmission are received from an integrated network.

10. The method of claim 1, further comprising:
determining a telephone number called by a subscriber;
determining a data network address of a voice mail system servicing said telephone number;
retrieving personal information data (PID) associated with said subscriber's voice mailbox; and
transmitting said retrieved PID to said voice mail system using said determined data network address.

11. The method of claim 10, further comprising, prior to said retrieving step, determining the identity of said subscriber.

12. The method of claim 11, wherein said data transmission is received and said subscriber's PID is transmitted over a dedicated data network.

13. A voice mail system comprising:
A first input/output (I/O) enabling said voice mail system to communicate with a voice network and receiving a voice transmission from a caller;
memory within which said voice transmission is stored in a voice mailbox of a subscriber; and
a second I/O enabling said voice mail system to communicate with a data network and receiving a data transmission related to said received voice transmission, said data transmission comprising personal information data (PID) corresponding to said caller, separate from caller identification information, if any, associated with said voice transmission, and transmitted from a remote voice mail system for said caller by:
determining a data network address of said voice mail system;
utilizing said data network address, establishing a data communications session between said remote voice mail system of said caller and said voice mail system; and
retrieving PID at said remote voice mail system for said caller and sending said data transmission with said PID to said voice mail system; and
storing said received PID in said voice mailbox.

14. The voice mail system of claim 13, wherein said first I/O and said second I/O are the same and communicate with an integrated voice and data network.

15. The voice mail system of claim 13, wherein said voice network is a Public Switched Telephone Network (PSTN).

16. The voice mail system of claim 15, wherein said data network includes at least one of the following networks: a local area network; a wide area network; an asynchronous transfer mode (ATM) network; and a synchronous optical network/synchronous digital hierarchy (SONET/SDH).

17. The voice mail system of claim 15, wherein said data network is a packet switched data network.

18. The voice mail system of claim 13, wherein said remote voice mail system for said caller further operates to:
determine an identity of said caller calling said subscriber; and
retrieve PID corresponding to said identity from a database within said remote voice mail system for said caller.

19. The voice mail system of claim 13, wherein said voice mail system further operates to:
determine, at said voice mail system, a number called by said caller to establish a transmission path for said voice transmission; and
retrieve, from a data network address database, a data network address of said voice mail system using said number called by said caller.

20. A computer readable media comprising computer code for adapting a computer to:
receive a voice transmission from a caller at a voice mail system through a first input/output (I/O);
store said received voice transmission in a voice mailbox of a subscriber;
receive a data transmission related to said received voice transmission of said voice mail system through a second I/O, said data transmission comprising personal information data (PID) corresponding to said caller, separate from caller identification information, if any, associated with said voice transmission, and transmitted from a remote voice mail system for said caller by:
determine a data network address of said receiving voice mail system;
utilize said data network address, establishing a data communications session between said remote voice mail system of said caller and said voice mail system; and
retrieve PID at said remote voice mail system for said caller and sending said data transmission with said PID to said voice mail system; and
store said received PID in said voice mailbox.

21. The computer readable media of claim 20, wherein said first I/O and said second I/O are the same and communicate with an integrated voice and data network.

22. The computer readable media of claim 20, wherein said computer is further adapted by said computer code to:
determine an identity of said caller calling said subscriber; and
retrieve PID corresponding to said identity from a subscriber database.

23. The computer readable media of claim 22, wherein said computer is further adapted by said computer code to:
determine a number called by said caller to establish a transmission path for said voice transmission; and
retrieve, from a data network address database, a data network address of said voice mail system using said number called by said caller.

* * * * *